United States Patent Office 3,499,789
Patented Mar. 10, 1970

3,499,789
MAGNETIC RECORDING ELEMENT

Paul J. Delmore, Rochester, N.Y., assignor to Eastman Kodak Company, Rochester, N.Y., a corporation of New Jersey No Drawing. Filed Jan. 19, 1968, Ser. No. 699,036
Int. Cl. G11b *5/64;* G03g *19/00*
U.S. Cl. 117—235 7 Claims

ABSTRACT OF THE DISCLOSURE

A magnetic recording element such as magnetic tape having a coating of magnetic particles such as, for example, acicular gamma iron oxide, dispersed in a polymeric binder comprising the reaction product of a polyvinyl acetal polymer and an imine-terminated polymer having a polymeric backbone derived from a poly(alkylene ether) glycol or a linear polyester.

This invention relates to magnetic recording elements, such as tapes, sheets, disks or drums, of the type comprising a support carrying a coating of magnetic particles dispersed in a polymeric binder. More particularly, this invention relates to a novel binder system for magnetic recording elements comprising the reaction product of a polyvinyl acetal polymer with an imine-terminated polymer.

Heretofore, a variety of polymeric binders have been proposed for use in preparing magnetic tapes and related magnetic recording media. For example, magnetic tapes have been prepared utilizing soluble binder systems based on copolymers of vinyl chloride and vinyl acetate. More recently, cross-linked binders of low solubility have been utilized with cross-linking being achieved by the use of isocyanates. Commercial interest has been particularly strong with respect to binder systems utilizing reactive diisocyanate prepolymers. None of the binder systems known to the art, however, has been without significant undesirable characteristics. Thus, many of the polymeric binders heretofore available have been deficient with respect to abrasion resistance so that the magnetic tape has been unable to withstand the severe wear encountered in use with present day equipment. On the other hand, while excellent abrasion resistance has been achieved by the incorporation of diisocyanate prepolymers in the binder system, use of these materials is attended by serious processing difficulties. Thus, for example, the solvent dispersion of magnetic particles and polymeric binder comprising diisocyanate prepolymer which is applied to the tape support has only a short pot life so that premature gellation is frequently encountered. Moreover, any trace of water present in the solvents or processing equipment will react with the terminal isocyanate groups of the prepolymer, whereby uniformity of product is extremely difficult to achieve, and the carbon dioxide evolved as a result of such reaction may form pinholes in the coating which are seriously detrimental to the performance of the tape.

It has now been discovered that magnetic recording elements, such as magnetic tape and the like, which exhibit the high abrasion resistance required by present day use can be produced with a polymeric binder prepared from a polyvinyl acetal polymer and an imine-terminated polymer. This novel binder system exhibits excellent room temperature stability and does not release carbon dioxide due to reaction with water so that the solvents employed in manufacturing the tape need not be absolutely dry and problems of pinhole formation in the coating are successfully avoided.

In accordance with this invention, a magnetic recording element comprises an inert support carrying a coating which comprises magnetic particles dispersed in a polymeric binder. The polymeric binder comprises the reaction product of (1) a polyvinyl acetal polymer with (2) an imine-terminated polymer which has a molecular weight of at least about 1,000 and is either a poly(alkylene ether) glycol or a linear dihydroxy terminated polyester in which the terminal active hydrogen atoms have been replaced by a radical containing an imine ring.

The magnetic recording elements of this invention may assume any suitable form known to the art but will usually be in the form of a tape, sheet, disk or drum. Any of a wide variety of inert materials may be employed as the inert support or backing; for example, the support may be made of glass, metal, paper or plastics such as cellulose acetate or polyvinyl chloride. Preferred materials for fabrication of the support for magnetic tape are chemically inert and dimensionally stable polyester resins and, in particular, oriented polyethylene terephthalate film such as is sold under the trademark Mylar. Such film is typically employed to prepare magnetic tape at a thickness of a few mils and may be of any convenient width, as for example, a width of two inches.

Magnetic materials which may be dispersed in polymeric binders to produce magnetic recording elements are well known to the art and any of the materials known to be suitable for this purpose may be employed in the practice of this invention. For example, the magnetic material may consist of particles of iron, magnetite, gamma iron oxide, zinc ferrous ferrite, or cobalt oxide. Preferably, the magnetic material will consist of acicular gamma iron oxide particles having an average particle size of about one micron or less. Particularly good results are obtained by use of gamma iron oxide produced in accordance with the process described in U.S. Patent 3,352,638 issued Nov. 14, 1967. The proportion of magnetic particles utilized in formulating the coating can be varied over a broad range, but is typically in the range from about 1 to about 10 parts per part of polymeric binder by weight and preferably in the range from about 2 to about 6 parts per part of polymeric binder by weight.

The coating of magnetic particles dispersed in polymeric binder material can be applied to the support in any suitable manner known to the art. Thus, for example, the magnetic particles and polymeric binder may be dispersed in an organic solvent by ball-milling or other suitable procedure and the resulting slurry applied to the support by means of knife coating, doctor blade coating, gravure coating, or the like. The particular solvent employed to formulate the slurry is not critical, as long as it is not reactive under the conditions involved, and examples of suitable materials for this purpose include tetrahydrofuran, toluene, dioxane, cyclohexanone, Cellosolve acetate, methyl ethyl ketone, methyl isobutyl ketone, and the like. The amount of solvent employed will, of course, depend upon the particular method and conditions utilized in the coating operation, but is ordinarily such as to provide a smooth, homogeneous and easily spreadable slurry. Coating thickness may be varied as desired and is typically in the range from about 0.2 to about 2 mils for magnetic tape.

Magnetic recording elements produced in the manner described herein have strongly adherent coatings which are hard, tough and elastic in nature. In consequence, abrasion resistance is very high and the product is capable of withstanding severe wear conditions such as are frequently encountered in data processing machines. The desirable combination of hardness and elasticity is imparted to the coating by the incorporation therein of a reaction product of a polyvinyl acetal polymer and an imine-terminated polymer, as described herein.

Although applicant does not wish to be bound by any theoretical explanation for the manner in which his novel binder systems function, it is believed that the imine-terminated polymer reacts with the hydroxyl groups of the polyvinyl acetal polymer to produce a cross-linked matrix which is hard but elastic in character. Specific characteristics which may be desired in the product can be achieved by varying the proportion of imine-terminated polymer to polyvinyl acetal polymer. Thus, for example, the imine-terminated polymer may be employed in an amount sufficient to react with all of the available hydroxyl groups or, alternately, greater or lesser proportions than this may be employed. Particularly, good results are obtained where the proportions of imine-terminated polymer and polyvinyl acetal polymer are such as to provide a molar ratio of imine group to hydroxyl group of about 0.02 to 1 to about 0.5 to 1 and preferably such as to provide a molar ratio of about 0.05 to 1 to about 0.2 to 1.

The polyvinyl acetal polymers employed in preparing the polymeric binder system of the present invention are well known commercially available materials and their use in coatings for magnetic recording elements is known to the art. These polymers are polyvinyl alcohols in which a major proportion of the hydroxyl groups have been condensed with aldehydes. Typical examples are polyvinyl formal, polyvinyl acetaldehyde acetal, and polyvinyl butyral. Among the polyvinyl acetal polymers of utility for the purposes of this invention are those sold under the trademarks Formvar, Alvar, and Butvar. Preferred polyvinyl acetal polymers for the purposes of this invention are the polyvinyl butyrals.

The imine-terminated polymers which are reacted with the above-described polyvinyl acetal polymers in accordance with this invention are also well known materials some of which are available commercially. These polymers retain the imine ring as a reactive site on the polymer chain, whereby formation of cross-links by a ring opening mechanism is rendered possible. The useful imine-terminated polymers for preparing polymeric binders of utility in magnetic recording elements are polymers which have a molecular weight of at least about 1,000, and more preferably at least about 2,000, and consist of poly(alkylene ether) glycols or linear dihydroxy terminated polyesters in which the terminal active hydrogen atoms have been replaced by a radical containing an imine ring. These polymers have stable oxygen linkages in the polymer backbone and on reaction with polyvinyl acetal polymers the result is a hard and abrasion resistant but non-brittle product.

A poly(alkylene ether) glycol or a linear dihydroxy terminated polyester can be converted to an imine-terminated polymer suitable for use in this invention by reaction with an organic diisocyanate followed by addition of an alkylenimine to the reactive isocyanate groups. Illustrative of the suitable poly(alkylene ether) glycols there may be mentioned polytetramethylene ether glycol, polyethylene ether glycol, polypropylene ether glycol, polybutylene ether glycol, and the like. Linear dihydroxy terminated polyesters may be prepared by methods known to the art by reaction of dihydric alcohols, for example, ethylene glycol or propylene glycol, with dibasic organic acids, for example, adipic acid or sebacic acid.

The exact nature of the radical containing the imine ring is not critical to the present invention, so that any of a wide variety of organic diisocyanates and alkylenimines could be employed to prepare the imine-terminated polymer. Thus, the organic diisocyanate may be aliphatic, cycloaliphatic or aromatic in nature; typical examples being 2,5-tolylene diisocyanate, 1,4-phenylene diisocyanate, 1,5-naphthalene diisocyanate, 1,6-hexamethylene diisocyanate, and 4,4'-dicyclohexylmethane diisocyanate. Illustrative of suitable alkylenimines which can be utilized to introduce the imine ring there may be mentioned ethylenimine, 1,2-propylenimine, 1,2-butylenimine, 1,1-dimethylethylenimine, and the like.

Among the imine-terminated polymers which may be employed with excellent results in the practice of this invention are those wherein the imine rings are part of a radical of the formula

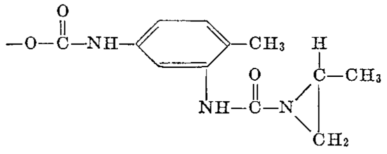

which is linked to the poly(alkylene ether) glycol or polyester backbone. These polymers are commercially available from Interchemical Corporation.

Magnetic recording elements prepared in accordance with this invention contain as an essential component of the coating a reaction product of a polyvinyl acetal polymer and an imine-terminated polymer as described hereinabove; such reaction product serving to adhere the magnetic particles to the support and providing the necessary abrasion resistance while at the same time exerting no serious detrimental effect on the essential magnetic characteristics of the magnetic particles. Use of such reaction products in preparing magnetic recording elements is particularly facilitated by the fact that the polyvinyl acetal polymer and the imine-terminated polymer may be blended in a solvent dispersion which is suitable for coating on the inert support but which retains good room temperature stability. After coating, curing of the coating composition may be effected by heating, either with or without the use of a curing catalyst as desired. Suitable curing conditions are curing times of several minutes to several hours at temperatures of about 40° C. to about 125° C., the longer times being used in conjunction with the lower temperatures.

In addition to the magnetic particles and the reaction product of a polyvinyl acetal polymer and an imine-terminated polymer, the coating may include conventional additives known to the art for incorporation in magnetic recording media, for example, surfactants, lubricants and plasticizers. It is particularly advantageous to incorporate in the coating a small amount of small particle size polytetrafluoroethylene, or other similar fluorine-containing polymer, to thereby improve the friction and wear properties of the magnetic recording element. The polytetrafluoroethylene should have a particle size of less than about one micron and is suitably employed in a proportion of a few parts, e.g. 5 parts, per 100 parts by weight of combined magnetic particles and polymeric binder.

The invention is further illustrated by the following examples of its practice.

EXAMPLE 1

A coating composition was prepared by blending together 10 grams of an imine-terminated polymer, 30 grams of polyvinyl butyral having an average molecular weight of about 50,000 and a content of vinyl alcohol groups of about 10 percent, 160 grams of acicular gamma ion oxide particles, 20 grams of Cellosolve acetate, and 275 grams of methyl isobutyl ketone. The imine-terminated polymer, a colorless liquid with a viscosity of approximately 890 poises available from Interchemical Corporation under the designation ITP-63A, had a poly(alkylene ether) glycol backbone with terminal radicals of the structure:

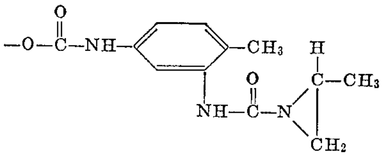

linked to the backbone, a molecular weight of 3,700, and an imine content of about 0.66 milliequivalent per gram of polymer. The coating composition was applied to a support of oriented polyethylene terephthalate film with a thickness of 1.0 mil in an amount sufficient to give a final coating thickness of 0.4 mil. The coating was cured by heating in an oven for 2 hours at 100° C., and as a result of such curing was rendered insoluble in conventional coating solvents utilized in preparation of magnetic tape. The physical and magnetic properties of the tape were substantially equivalent to an otherwise identical tape prepared in accordance with the prior art by using a reactive diisocyanate prepolymer in place of the imine-terminated polymer of this invention. Thus, the novel binder system disclosed herein is seen to provide a tape of commercially acceptable quality while at the same time providing important processing advantages, as hereinbefore discussed, compared with the prior art binder systems utilizing reactive diisocyanate prepolymers

EXAMPLE 2

A coating composition was prepared by dispersing the same iron oxide particles, polyvinyl butyral, and imine-terminated polymer as are described in Example 1, in a proportion of 100 parts of iron oxide particles to 20 parts polyvinyl butyral to 5 parts imine-terminated polymer, in sufficient methyl isobutyl ketone to produce a slurry with a solids content of 40 percent. This slurry was then applied to oriented polyethylene terephthalate film with a thickness of 1.0 mil using a pilot coating machine giving a coating thickness of 0.4 mil and cured by heating at 120° C. for 15 minutes. The resulting tape possessed similar physical and magnetic properties to that described in Example 1.

EXAMPLE 3

For purposes of comparison, coating compositions were prepared utilizing as the binder (1) the polyvinyl butyral described in Example 1, (2) the reaction product of the aforesaid polyvinyl butyral with a reactive diisocyanate prepolymer, and (3) the reaction product of the aforesaid polyvinyl butyral with an imine-terminated polymer, and then magnetic tapes were produced from each of these compositions using, in each instance, the same polyethylene terephthalate support and the same thickness of coating. In formulating each of the coating compositions, the magnetic particles and binder were dispersed in sufficient methyl isobutyl ketone to produce a slurry with a solids content of about 37 percent. Composition (1) was prepared from 8 parts of iron oxide particles and 2 parts of polyvinyl butyral, composition (2) from 8 parts of iron oxide particles, 1.33 parts of polyvinyl butyral and 0.67 part of reactive diisocyanate prepolymer (available commercially under the trademark Adiprene L–167), and composition (3) from 8 parts of iron oxide particles, 1.33 parts of polyvinyl butyral and 0.67 part of the imine-terminated polymer described in Example 1. The relative performance characteristics of the three tapes are indicated by the data in the following table:

| Coating composition | Relative output as percent of standard reference in digital test | | | Number of cycles to failure [2] in loop test |
|---|---|---|---|---|
| | 200 b.p.i.[1] | 500 b.p.i. | 1,000 b.p.i. | |
| 1 | 146 | 139 | 130 | 671 |
| 2 | 142 | 137 | 124 | 859 |
| 3 | 146 | 137 | 136 | 1,170 |

[1] B.p.i.=bits per inch.
[2] Term "failure" indicates magnetic failure, i.e., first point at which something recorded on the tape cannot be read out by the magnetic head.

The invention has been described in detail with particular reference to preferred embodiments thereof, but it will be understood that variations and modifications can be effected within the spirit and scope of the invention as described hereinabove.

I claim:

1. A magnetic recording element comprising an inert support carrying a coating thereon, said coating comprising magnetic particles dispersed in a polymeric binder, said binder comprising the reaction product of a polyvinyl acetal polymer and an imine-terminated polymer, said imine-terminated polymer having a molecular weight of at least about 1,000 and being selected from the group consisting of poly(alkylene ether) glycols and linear dihydroxy terminated polyesters in which the terminal active hydrogen atoms have been replaced by a radical containing an imine ring.

2. A magnetic recording element as described in claim 1 wherein said inert support is a polyethylene terephthalate film.

3. A magnetic recording element as described in claim 1 wherein said magnetic particles are acicular gamma iron oxide particles.

4. A magnetic recording element as described in claim 1 wherein said polyvinyl acetal polymer is polyvinyl butyral.

5. A magnetic recording element as described in claim 1 wherein said radical containing an imine ring is represented by the structural formula:

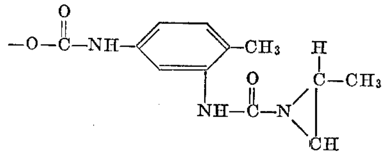

6. A magnetic recording element as described in claim 5 wherein said inert support is a polyethylene terephthalate film, said magnetic articles are acicular gamma iron oxide particles present in a proportion of from about 1 to about 10 parts per part of polymeric binder by weight, said polyvinyl acetal polymer is polyvinyl butyral, and the proportion of said imine-terminated polymer to said polyvinyl acetal polymer is such as to provide a molar ratio of imine groups to hydroxyl groups of from about 0.02 to 1 to about 0.5 to 1.

7. A magnetic recording element as described in claim 5 wherein said inert support is a polyethylene terephthalate film, said magnetic particles are acicular gamma iron oxide particles present in a proportion of from about 2 to about 6 parts per part of polymeric binder by weight, said polyvinyl acetal polymer is polyvinyl butyral, and the proportion of said imine-terminated polymer to said polyvinyl acetal polymer is such as to provide a molar ratio of imine groups to hydroxyl groups of from about 0.05 to 1 to about 0.2 to 1.

References Cited

UNITED STATES PATENTS 3,357,855 12/1967 Bisschops et al.
3,419,420 12/1968 Stahly et al. ________ 117—161 X WILLIAM D. MARTIN, Primary Examiner
B. D. PIANALTO, Assistant Examiner U.S. Cl. X.R.

117—161, 240; 252—62.54